May 21, 1940.　　　G. STAVROU　　　2,201,801
BAKING OVEN
Filed April 12, 1939　　2 Sheets-Sheet 1
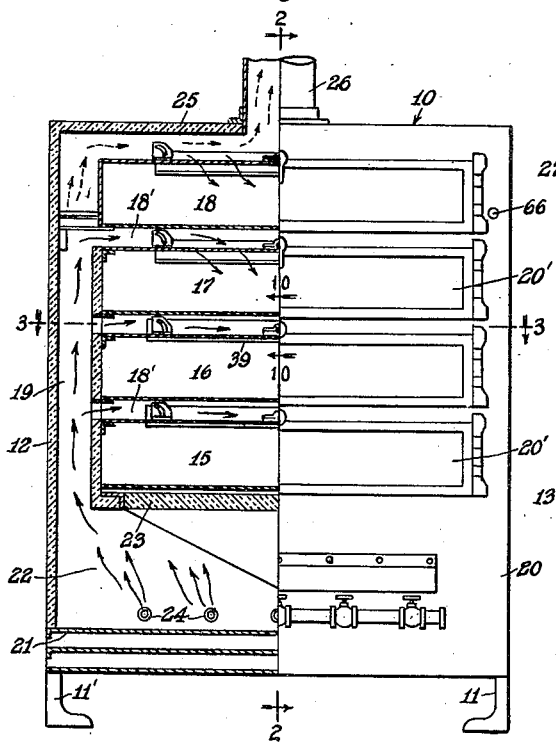
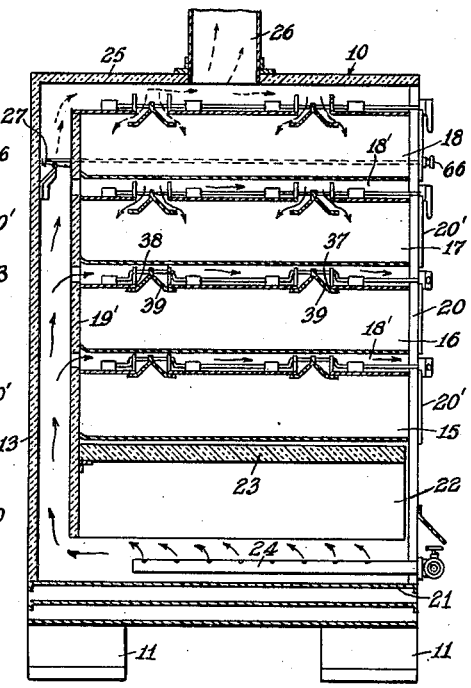
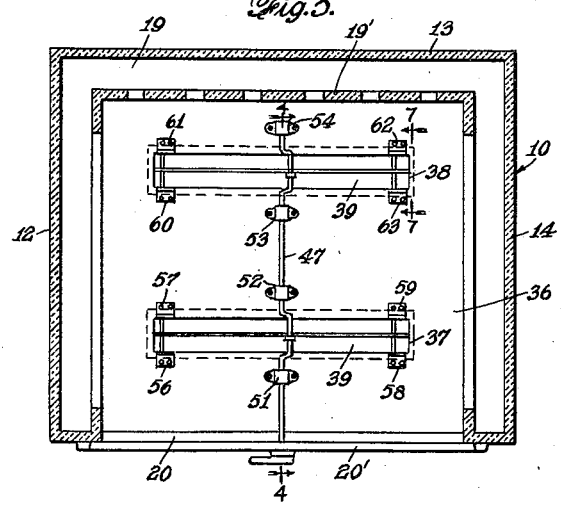
INVENTOR.
GEORGE STAVROU
BY
ATTORNEY.

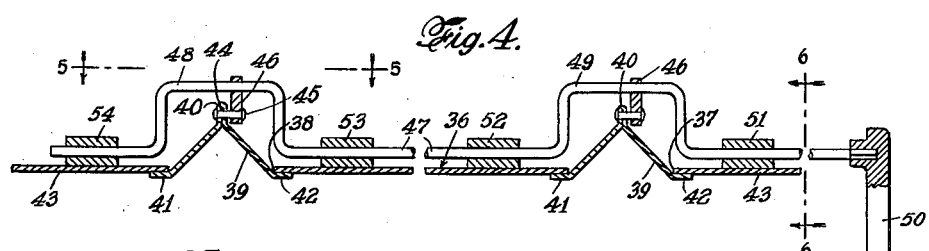
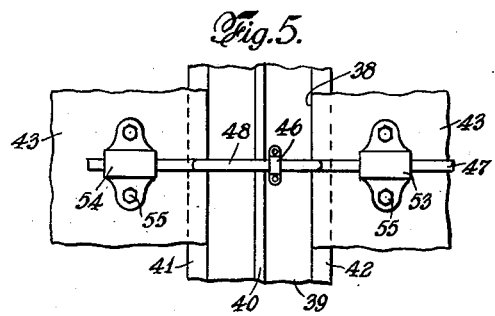
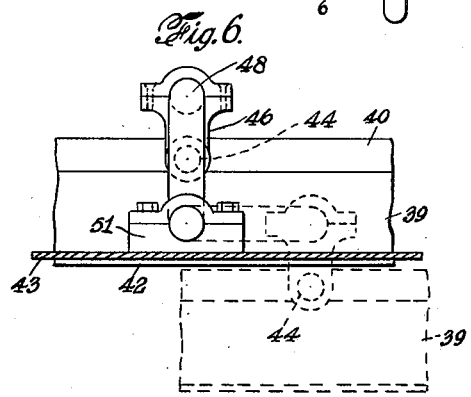
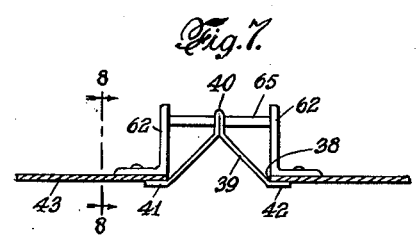
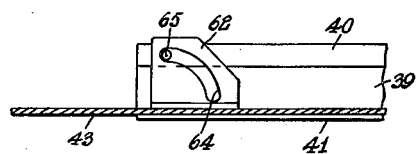
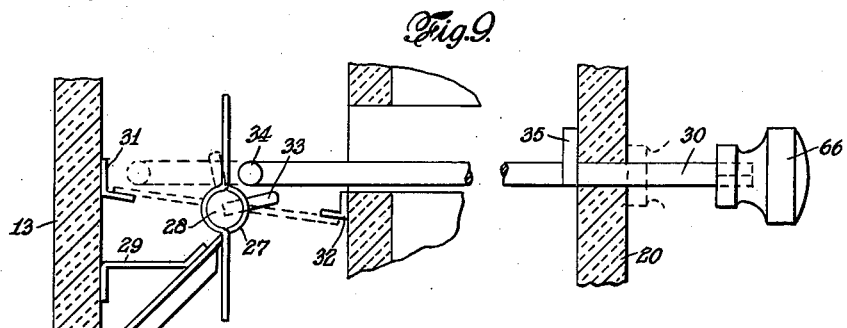
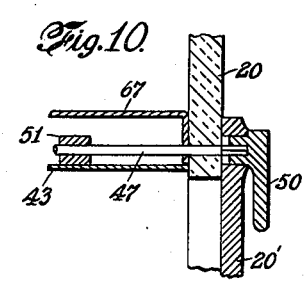

Patented May 21, 1940

2,201,801

UNITED STATES PATENT OFFICE 2,201,801

BAKING OVEN

George Stavrou, Brooklyn, N. Y.

Application April 12, 1939, Serial No. 267,374

12 Claims. (Cl. 107—55)

This invention relates to baking ovens and the like. More particularly, it relates to improvements used in connection with food baking ovens for selectively controlling the heat in various parts therein.

The present invention has for one of its objects the efficient and selective regulation of heat in various compartments of the oven in order to reduce the heating cost of making bread and to fully utilize the heat used in baking operations. The invention, furthermore, has as an another object the provision of a simply constructed, easily operated oven in which bread and the like may be baked at differently selective temperatures.

Broadly considered, an oven made in accordance with my invention comprises a heating chamber, a plurality of baking compartments disposed one above the other over the chamber, an easily operable device in connection with each of the compartments for controlling the flow of heat therethru, and a damping device mounted in the oven for regulating the heat flowing thru the oven into the chimney thereof.

In the accompanying drawings forming a part of the description of a preferred embodiment of my invention:

Fig. 1 is a vertical view of the embodiment, showing a part thereof in section

Fig. 2 is a vertical sectional view taken on line 2—2 of Fig. 1.

Fig. 3 is a plan view taken on line 3—3 of Fig. 1.

Fig. 4 is a detail, fragmental longitudinal view of a part of the embodiment.

Fig. 5 is a top plan view of a section taken on line 5—5 of Fig. 4.

Fig. 6 is a vertical end view taken on line 6—6 of Fig. 4, showing a change of position of the section when in operation.

Fig. 7 is a fragmental end view of a section of the embodiment taken in the direction of arrows 7—7 in Fig. 3.

Fig. 8 is a fragmental detailed side view of the section shown in direction of line 8—8 of Fig. 7.

Fig. 9 is a fragmental detailed view of the damping device forming a part of the embodiment herein, and Fig. 10 is a detail of the view shown in the direction of arrows 10—10 in Fig. 1.

Referring now particularly to the accompanying drawings in which similar reference characters refer to like parts thruout, an oven 10 is shown having a plurality of suitable supports 11 and 11' therefor to keep the same raised above the flooring wherever used. Said oven 10 has vertically disposed walls 12, 13, and 14 made of suitable material and a plurality of superimposed compartments 15, 16, 17, and 18 adapted for use in baking of bread, cake, and the like. Intermediate said compartments is a plurality of spaces 18'. Said compartments are set inwardly of walls 12, 13, and 14 respectively, forming a heat conducting space 19 therebetween and a common rear wall 19', and are provided with a front integral with the front wall 20 of the oven altho each compartment has a door therein at the front. The front of each compartment has a hinged door 20' which may be swung outwardly of wall 20. It is to be noted that these hinged doors 20' are of a conventional type generally used in baking ovens. They are not very tight fitting when in closed position against front wall 20 thereby permitting some heated air entering the compartment to escape therefrom during the baking operation. Therefore, some of the heated air in circulating through space 19 and intermediate spaces 18' heats the air in each compartment by means of convection currents without requiring any extra devices for controlling the outflow of heat energy from the compartments.

Said oven is furthermore, provided with a flooring 21 forming a combustion area 22 with a ceiling 23 disposed at the bottom of compartment 15. Within area 22 is mounted a heating element 24 connected with a source of fuel for heating the oven. It is to be noted that roof or top 25 of the oven is provided with a centrally located chimney 26 connected thereto to permit the escape of the flue and other waste gases coming up from the heating element 24 and passing thru the interior of the oven as shown by the arrows in Figures 1 and 2. In order to control the escape of heat and gases from the oven thru chimney 26, there is provided a damper 27 mounted on a pivoted member 28 fixed on to a brace 29 on rear wall 13 at the upper part thereof as shown in the drawings.

Said damper 27 is operated by means of a manually operable shaft 30 extending from the front wall 20 to the rear wall of the oven, as shown in Figs. 2 and 9. The damper is adapted, when closed to prevent the escape of heat to the chimney 26, and permit accumulation of the heat in the oven. There are provided stop members 31 and 32, mounted diagonally opposite each other on walls 13 and 19' respectively to prevent the damper from being in a non-operable position. Furthermore, said damper is provided with a member 33 radially extending from the center thereof to permit contact with a member 34 perpendicularly projecting from shaft 30. Said member 34 contacts member 33 to actuate the damper into closed or open position as shown when the shaft 30 is operated inwardly or outwardly of the oven. Shaft 30 is also provided with a stop 35 disposed at a spaced interval from the forward end thereof to regulate the length of outward movement of the shaft, by making contact with front wall 20 of the oven and with a knob 66 at the terminal, external portion of said shaft.

It is to be noted that the damper is disposed in the only passage way thru which the heat and flue gasses escape into the chimney, the remaining part of the heat conducting space 19 being closed off thereat by any well-known suitable means.

In order to selectively regulate the flow of heat in each compartment of the oven, there is provided a device which can be operated independently of damper 27. Since each compartment in the oven is of similar construction, only one compartment, namely 16, will be considered in detail with the regulating device thereon, this detail however, being applicable to other compartments. The top 36 of the compartment as shown in Fig. 3 is provided with a plurality of parallel slots or grooves 37 and 38, respectively, extending crosswise thereon, into each of which operatively depends a shutter 39, extending the length of the slot. It is to be noted that each of the shutters is of triangular cross sectional outline having an upwardly extending leg 40 to permit raising and lowering thereof into the opening, and is provided with lateral oppositely extending portions 41 and 42 adapted to make contact with the ceiling 43 adjacent the opening of the compartment.

The upwardly extending leg 40 of the shutter 39, as shown in Fig. 4, at the center thereof is provided with an opening 44 into which fits a pintle 45 hinged to a drop member 46. Said drop member in turn is mounted onto a cross bar 47 and operable thereby. It is to be noted that cross bar 47 extends substantially the depth of the compartment and has a plurality of right angled bends 48 and 49, respectively for accommodating a plurality of drop members thereon as shown in Fig. 4. The bends 48 and 49 are raised from the major axis of bar 47 for connection with the drop member 46, whereby the shutter 39 is raised or lowered as desired when bar 47 is actuated by means of handle member 50 disposed at the end of the bar 47, outside front wall 20.

Said bar 47 may be rotated by handle member 50 on the outside wall 20 of the oven and is mounted on a plurality of bearing members 51, 52, 53, and 54 disposed at spaced intervals thereof, said bearing members being fixed to the roof of the compartment 16, by any suitable means such as bolts 55 as shown. In operating bar 47, it is to be noted that shutters 39 may not be moved evenly because they extend substantially the length of the slots or openings 37 and 38. To avoid the uneven raising or lowering of said shutters, there are provided guide braces 56, 57, 58, 59, 60, 61, 62, and 63 respectively mounted at the respective ends of the slots 37 and 38 and to either side thereof to the roof 43 of the compartment 17 as shown in Fig. 3. Said braces are provided with curved slots 64 as shown in Figure 8 for guiding the movement of pintle 65 disposed at the ends of the shutter 39. It is to be noted also that said bar 47 is disposed to extend through the space intermediate roof 43 and floor 67, as shown in Fig. 10.

In the operation of the oven as shown, the temperature control is effected generally by means of damper 27. However, for regulation of heat flow thru each of compartments 15, 16, 17, and 18, the rod 47 is actuated whereby shutters 39 may be raised from or lowered into each compartment to prevent or permit the flow of heat therethru as desired. In this operation, the various compartments may be heated to different temperatures depending upon the type of material or dough being baked. Some materials require higher heat than others in the baking operation thus permitting a selective treatment of the materials. The heat, when the shutters are open, may become uniform inside the compartment by means of heat interchange. It may also flow thru space 19 into spaces 18' into the slots 37 and 38 and into the compartment. Since the front doors 20' are of the conventional type they are not air tight and permit a slight circulation of heated air from space 19 through the slots 37 and 38 of the respective compartment. Furthermore, since the hot gases rise and cannot escape as fast as they rise, there is a diffusion of heat throughout the various compartments which have slots 37 and 38 open, thereby producing in time a uniformly heated compartment for baking or cooking purposes.

While the present embodiment is considered in connection with the baking of bread, it is understood that I am not limited thereto but may use the same for baking potatoes, fruits or other substances. Dough baked in an oven as disclosed herein is better and more evenly cooked than in ovens heretofore used.

While the present invention as described herein is taken in connection with the accompanying drawings, it is to be understood that modifications as to form, use and arrangement of material may be made without departing from the scope and spirit of the invention.

I claim:

1. An oven for baking bread and the like comprising outer walls, a plurality of spaced, superimposed compartments forming an intermediate heat conducting space with said walls, said compartments having a front portion common with one of the walls, a combustion chamber disposed at the bottom of the compartments, means in the intermediate space adapted to control the flow of heat from the oven to the outside thereof, and a plurality of independently, manually operable means mounted in each compartment adapted to be depressed into each compartment to regulate the flow of heat from the oven into the compartments.

2. An oven for baking bread and the like, comprising a plurality of outer walls, a series of operable compartments vertically disposed above each other at spaced intervals being integral with one of the walls and forming an intermediate heat conducting space with the other walls, a roof, in connection with said outer walls, having a chimney extending centrally therefrom, actuable means disposed in the intermediate space for damping the heat passing therethru, heating means disposed under one of the compartments, each of said compartments having a plurality of slots at the top thereof, and manually operable shutters for said slots adapted to depend thereinto and control the flow of heat into the compartments.

3. An oven for baking, comprising a plurality of vertically disposed walls, a support for said walls, a flooring in connection with said walls, a roof in connection with the upper portion of the walls having a chimney in connection therewith, a plurality of superimposed spaced compartments forming a rear and side wall having a plurality of grooves in the top thereof and being integral with one of the vertically disposed walls to form a front thereof, said compartments forming a heat conducting area with the vertically disposed walls, a heating unit disposed below the flooring, manually operable means mounted in the heat conducting area to regulate the flow of heat thru said area, and a plurality of manually actuable shutter means disposed in the grooves of the compartments adapted to be raised and lowered to regulate the flow of heat from the heat conducting area into the compartment.

4. An oven according to claim 3, in which the manually operable means are in hinged connection with a cross bar extending substantially across the depth of the compartment.

5. An oven for baking bread and the like comprising a plurality of vertically disposed walls, a support for said walls, a flooring in connection with the walls, a roof for the walls, having a chimney in connection therewith, a heating unit adjacent the flooring in connection with a source of fuel energy, a series of superimposed spaced compartments having a plurality of parallel grooves extending across the tops thereof, said compartments being set inwardly of a plurality of the vertical walls and forming a heat conducting area therewith, each of the spaces intermediate the compartments being in communication with the heat conducting area, a manually operable damping device disposed in the heat conducting area to regulate the flow of heat therefrom into the chimney, suspended shutter means for each of the grooves in the compartments adapted to close and open the same for regulating the flow of heat thereinto, manually operable hinged means for actuating the same, and bearing means fixing the hinged means to the compartments.

6. An oven according to claim 5, in which the heating unit is surrounded by a combustion area, and the shutter means for each groove in each compartment can be raised or lowered for selectively and individually heating each compartment.

7. In an oven for baking and the like, a plurality of superimposed compartments having a pair of parallel grooves in the tops thereof, each of said compartments having an intermediate heat conducting space therebetween, and a common front, rear and side walls, said rear and side walls having openings for the communication of the heat conducting space with a source of heat, manually operable shutter means for each of the grooves in the compartments for regulating the flow of heat thru the heat conducting spaces into the compartments, a shaft in hinged connection with a pair of the shutters for simultaneously and vertically operating the same in each compartment, and manually operable means outside the compartments for actuating the shafts for raising and lowering the shutter means.

8. An oven according to claim 7, in which the compartments are surrounded by a plurality of vertical walls forming an intermediate heat conducting area with a number of the walls, and having a combustion chamber disposed beneath the compartments.

9. In an oven for baking and the like, a plurality of superimposed compartments having parallel grooves in the tops thereof, each of said compartments having an intermediate heat conducting space therebetween, and a common front, rear and side walls, a hinged door for each of said compartments, said rear and side walls having openings for communication with a source of heat energy, vertically movable shutter means for each of the grooves in the compartments for regulating the flow of heat thru the intermediate spaces into the compartments, a rotatable shaft mounted onto each compartment in hinged connection with a pair of the shutters for each compartment, for simultaneously operating the same, and manually operable means outside the compartments for actuating the shafts.

10. An oven for baking and the like, comprising a plurality of vertically disposed outer walls, and a roof with a chimney therein, a support for the walls, a flooring above the support, a plurality of superimposed, rectangular shaped compartments having an intermediate space therebetween, said compartments having a face or front common with one of the vertical walls, and forming with the remaining vertical walls an intermediate heat conducting space for the compartments, the lowermost compartment and the flooring forming a heat combustion area, manually operable damping means disposed in the heat conducting space for controlling the exit of heat and gases therefrom, said compartments each having a hinged outwardly swinging door on the front thereof and grooves in the tops thereof, hingedly mounted shutters for said grooves adapted to be moved vertically in the compartments, manually operable shaft members mounted on the tops of said compartments in connection with the shutters for covering and closing said grooves, and guided means fixed to the tops of the compartments for guiding the movement of the shutters into and out of the grooves.

11. An oven according to claim 10 in which the compartments are provided with hinged doors and a heat generating unit is disposed in the combustion area.

12. In an oven for baking and the like, a compartment having a front outwardly swingable door, and a plurality of parallel openings in the top thereof, a plurality of triangular shaped shutters for said openings, manually operable means in hinged connection with the shutters for actuating the same into locked position against the openings, bearing members mounted on top of the compartment for said means, and a plurality of guide braces mounted on the top of the compartment for guiding the shutters in their opening and closing positions.

GEORGE STAVROU.